US009141899B2

(12) United States Patent
Decoux et al.

(10) Patent No.: US 9,141,899 B2
(45) Date of Patent: Sep. 22, 2015

(54) TWO-DIMENSIONAL IDENTIFICATION PATTERN, ARTICLE INCLUDING SUCH A PATTERN, AND METHODS FOR MARKING AND IDENTIFYING SUCH A PATTERN

(75) Inventors: Eric Decoux, Vevey (CH); Dave Vuistiner, Lausanne (CH)

(73) Assignee: SICPA HOLDINGS SA, Prilly (CH)

( * ) Notice: Subject to any disclaimer, the term of this patent is extended or adjusted under 35 U.S.C. 154(b) by 0 days.

(21) Appl. No.: 13/501,618

(22) PCT Filed: Sep. 24, 2010

(86) PCT No.: PCT/EP2010/064187
§ 371 (c)(1),
(2), (4) Date: Jun. 7, 2012

(87) PCT Pub. No.: WO2012/037985
PCT Pub. Date: Mar. 29, 2012

(65) Prior Publication Data
US 2013/0168451 A1    Jul. 4, 2013

(51) Int. Cl.
*G06K 7/10* (2006.01)
*G06K 19/06* (2006.01)
(52) U.S. Cl.
CPC ...... *G06K 19/06037* (2013.01); *G06K 7/10821* (2013.01); *G06K 19/06046* (2013.01)
(58) Field of Classification Search
CPC .......................... G06K 7/1022; G06K 7/1417
USPC ................. 235/454, 494, 462.09–12
See application file for complete search history.

(56) References Cited

U.S. PATENT DOCUMENTS

| 4,545,066 | A | * | 10/1985 | Gascuel et al. | 382/182 |
| 4,998,010 | A | * | 3/1991 | Chandler et al. | 235/494 |
| 7,581,683 | B2 | * | 9/2009 | Walmsley et al. | 235/494 |
| 2007/0158420 | A1 | | 7/2007 | Sonoda et al. | |
| 2008/0179406 | A1 | * | 7/2008 | Rivaillier | 235/494 |
| 2009/0323124 | A1 | | 12/2009 | Wei et al. | |

FOREIGN PATENT DOCUMENTS

FR    2 882 173    8/2006

OTHER PUBLICATIONS

International Search Report Issued Aug. 4, 2011 in PCT/EP10/64187 Filed Sep. 24, 2010.

* cited by examiner

*Primary Examiner* — Daniel St Cyr
(74) *Attorney, Agent, or Firm* — Oblon, McClelland, Maier & Neustadt, L.L.P.

(57) ABSTRACT

A method for marking an article with an identification pattern which may include information relating to the article and/or to the use thereof, the method including: defining an alphabet of a plurality of symbols; defining, for each symbol, at least two valid states and at least one invalid state; developing a reference pattern including a set of symbols from the alphabet; developing at least one representation of the reference pattern by allocating a specific valid state to each symbol of the reference pattern; and applying a marking, reproducing the representation of the reference pattern, onto the article.

15 Claims, 4 Drawing Sheets

Figure 1:
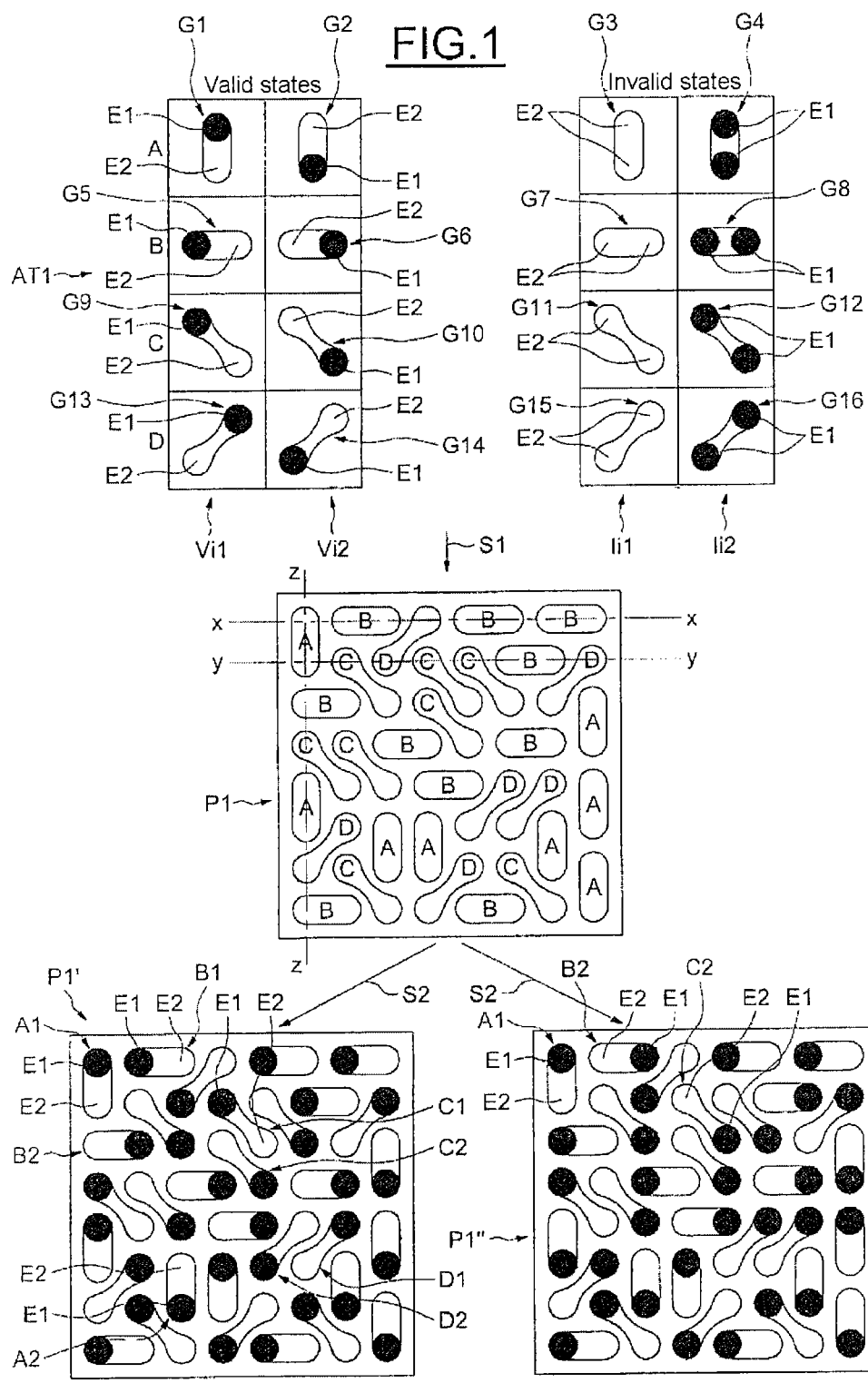

TWO-DIMENSIONAL IDENTIFICATION PATTERN, ARTICLE INCLUDING SUCH A PATTERN, AND METHODS FOR MARKING AND IDENTIFYING SUCH A PATTERN

The invention relates to two-dimensional identification patterns, in particular patterns used for the identification of articles.

The invention also relates to the articles comprising such patterns, as well as the methods for marking and identifying these patterns on such articles.

Currently, articles are identified by a mark or a logo inscribed on a package of the article or on the article itself. These inscriptions are visible and make it possible for the article to be identified by all the users.

It is also possible to use other visible identifiers which contain encrypted information so that the content of the identifier is not recognized by all the users.

Identifiers which can be cited as examples include one-dimensional identifiers of the bar-code type or two-dimensional identifiers of the data matrix type which are the most widely used.

Bar codes represent information using a pattern consisting of bars of different thicknesses and spacings. However, these patterns can easily be decrypted.

Moreover, the identifiers of "data matrix" type use white and black pixels forming a symbol and which are arranged within a pattern having a rectangular or quadratic form. The pattern of such a data matrix consists of two adjacent "L" shaped solid edges, which as a whole are called "identification pattern", and two edges formed by alternate white and black pixels, called "reference edges". The identification pattern is used to locate and orient the symbol and the reference edges make it possible to count the number of columns and rows in the symbol. Furthermore, the data matrix also uses a detection area, sometimes called "quiet zone", to detect the identification pattern. This detection area is used to clearly isolate the identification pattern from any other element of the article with which it could be confused.

However, these identifiers, which are visible to the user, notably through their identification pattern and their detection area, have to be marked in a chosen place on the article in order not to damage its general appearance. Moreover, the identification pattern is a known and constant pattern regardless of the article to be identified. This identification pattern does not contain information and is used purely to detect the symbol.

Furthermore, these data matrices, although provided with error correction mechanisms, are not sufficiently robust because they depend on the substrate on which they are deposited. In practice, depending on the unevennesses of the substrate, the latter may degrade the pattern during its marking on the article. The robustness of such a pattern also depends on the print quality, because a printing defect, for example an ink which spreads or an absence of printing of a pixel of the symbol, may greatly affect the pattern. In certain cases, a pattern in the form of a data matrix with dimensions of 16 pixels by 16 pixels may thus be rendered illegible by the destruction of more than 6 pixels.

There is proposed, according to the present invention, a two-dimensional identification pattern which enhances the robustness of the identification of conventional articles.

There is also proposed an identification pattern which is invisible to the user while being detectable by a suitable detection system.

Also proposed are an article comprising such an identification pattern, and methods for marking and identifying the identification pattern.

According to one aspect of the invention, there is proposed a two-dimensional identification pattern comprising an arrangement of representations of symbols belonging to an alphabet comprising a plurality of symbols, each symbol of the alphabet comprising at least three states, including at least two valid states and at least one invalid state, each representation of a symbol in said arrangement corresponding to a valid state of said symbol.

Thus, an identification pattern is provided which is particularly robust because it comprises a number of symbols and offers a high number of possibilities of organization for a determined reference pattern. The expression "reference pattern" should be understood to mean an arrangement of symbols, and the expression "identification pattern" should be understood to mean one possible representation out of all the representations of the symbols of the reference pattern.

Furthermore, each symbol of the reference pattern may have a number of possible representations, which increases the number of combinations of representations of one and the same reference pattern. In practice, a pattern that has a determined arrangement of symbols may have a number of possible representations corresponding to the possible valid states of each symbol.

Thus, the pattern is rendered illegible to a user who does not already know the alphabet used to create the pattern, that is to say, who does not know the valid and invalid states of the symbols. Even if a user could detect the states inscribed on an article, not knowing the alphabet it is very difficult, or almost impossible, for him or her to determine the symbols from a reconstruction of all the combinations of valid and invalid states to obtain the alphabet of symbols. The fact that the symbols inscribed on the article cannot be determined makes the pattern impossible to find. The invalid state or states of the symbols in particular make the reading practically impossible without the knowledge of the alphabet.

In particular, if the pattern comprises different symbols, the number of combinations increases and makes its recognition even more difficult.

Furthermore, the identification pattern does not require the use of a particular identifier in its subsequent identification. Compared to a pattern in the form of a data matrix, the identification pattern according to the invention does not need a specific detection area to identify the pattern.

According to one embodiment, each valid state comprises at least two elements having a first possible representation and a second possible representation distinct from the first representation.

According to an advantageous embodiment, each state of the symbols of the alphabet comprises a group of elements. Each of said groups of elements comprises at least two elements. Each element comprises a possible representation out of a set of representations comprising a first representation and a second representation distinct from the first representation.

Furthermore, each symbol comprises a first valid state comprising a first group of at least one element represented according to the first representation and at least one element represented according to the second representation, and a second valid state comprising a second group of at least one element represented according to the second representation and at least one element represented according to the first representation.

Thus, an identification pattern is provided for which the symbols have two complementary valid states since the first element of a group for one valid state is different from the first element of the group corresponding to the other valid state. Similarly, the second element of one group is different from the second element of the other group, each group corresponding to a valid state. Valid states are thus provided which have representations arranged differently. When, for example, the same ink surface area is used to represent these complementary valid states on the article, the identification pattern is made uniform on a macroscopic scale, which makes it more difficult to detect. In practice, if each element is produced, for example, by a dot or a spot of ink of determined surface area, the fact that the valid states all have the same number of dots or spots of ink makes it possible to obtain the same surface area of ink and therefore the same surface density of ink for all the valid states and therefore also for the identification pattern consisting of the arrangement of the different symbols in one or other of their valid states.

According to another embodiment, each of said groups of elements comprises more than two elements. Each symbol comprises a first valid state comprising a first group of a number of elements represented according to a first representation and of a number of elements represented according to a second representation. Each symbol also comprises a second valid state comprising a second group of a number of elements represented according to the second representation and of a number of elements represented according to the first representation. The number of elements in each group may be, for example, four, without this number being limiting.

Thus, an identification pattern is provided which comprises complex symbols, which increases the difficulty in recognizing the pattern in a subsequent unauthorized identification attempt.

The abovementioned groups of elements may preferably comprise one and the same number of elements, which enhances the uniformity of the identification pattern to make it even more difficult to detect when said elements are produced by a dot or a spot of ink of determined surface area.

According to a preferred embodiment, at least one valid state of at least one symbol of said identification pattern represents a digital information item. Thus, it is possible to encrypt a digital information item using the valid states of the symbols of the identification pattern.

The invention thus provides a very robust encryption means because, firstly, the identification pattern has to be recognized, then its content has to be identified, before the information that it contains can be accessed.

The valid states of each symbol of the pattern may respectively represent binary values of a digital information item. The pattern is therefore particularly suited to encrypting binary information.

According to another aspect of the invention, an article is proposed which comprises at least one identification pattern defined above.

This article may be any type of medium for the identification pattern, such as a box, a sheet, for example made of aluminum, a capsule or a cartridge which may, for example, contain an edible substance such as coffee or tea, a bottle stopper, a bank note, a passport, a security document, a label, a card, a trade voucher, a pharmaceutical pill, a watch, any medium having a metal or ceramic surface, a package, a semiconductor, peripheral devices for computers (mice, keyboards, . . . ), etc.

According to one embodiment, at least one identification pattern is present on the article, for example on a layer of said article.

The article may comprise a number of identification patterns corresponding to one or more representations of one and the same reference pattern.

By virtue of the repetition of the identification pattern, the robustness with respect to its subsequent identification is enhanced. This repetition prevents any impairment of the detection of the pattern, since the impairment of one identification pattern does not prevent the detection of the presence of at least one pattern out of all the identification patterns marked on the article.

The identification patterns may be all identical or all different in their representation.

The article may also comprise identical identification patterns and different identification patterns in their representation, that is to say, for which the valid states used for the representation of the different symbols are not the same for all the symbols of the reference pattern used.

According to another aspect, the invention also proposes a method for marking an article with an identification pattern which may include an information item relating to the article and/or its use. The method comprises the following steps:
  an alphabet is defined which consists of a number of symbols;
  for each symbol, at least two valid states and at least one invalid state are defined;
  a reference pattern is created which comprises a set of symbols of the abovementioned alphabet;
  at least one representation of said reference pattern is created by assigning a specific valid state to each symbol of the reference pattern;
  finally, a marking reproducing said representation of the reference pattern is applied to the article.

By virtue of the structure of the identification pattern used, the unevennesses of the medium or the print quality cannot impair it because a number of symbols of the identification patterns may be affected without in any way preventing a subsequent identification of the pattern.

Each symbol can be represented by at least two elements having a first possible representation and a second possible representation.

Preferably, each valid state comprises a group of at least one element represented according to the first representation and of at least one element represented according to the second representation, each valid state of one symbol being different from a valid state of another symbol.

According to another implementation, each invalid state of a symbol is different from the valid states of any one of the symbols of the alphabet.

The valid states of all the symbols may be represented by a group of elements comprising the same number of elements.

In another aspect, the invention also proposes a method for identifying an identification pattern applied to an article and which may include an information item relating to the article and/or its use. The method comprises the following steps:
  an image is captured of an area of the article which contains at least a portion of a representation of at least one stored reference pattern comprising an arrangement of a number of symbols belonging to a stored alphabet, each symbol comprising at least two valid states and at least one invalid state, each representation of a symbol in said arrangement corresponding to a valid state of said symbol, and the captured image is stored;
  the symbols of the stored alphabet of symbols are identified by comparing the captured image with the arrangement of representations of symbols of the stored reference pattern;

the number of identified symbols represented in a valid state and arranged according to the arrangement of said stored reference pattern is computed;

the result of the computation is compared to a probability threshold;

and an identification signal is sent if the result reaches said threshold.

According to yet another implementation, a first symbol is defined in a first position of the arrangement of the stored reference pattern; the captured image is searched for a representation of at least one valid state of said first symbol; if this representation is found, it is considered that the selected symbol is identified, then another symbol is defined in another position of the arrangement of the stored reference pattern, and the preceding search step is reiterated for this other symbol in this other position, and so on until all the symbols of the stored reference pattern are identified or not.

In another implementation, the method comprises a step of decrypting at least one digital information item represented by at least one valid state of at least one symbol of the identification pattern comprising an identification of said digital information item based on at least one valid state of at least one identified symbol.

In all cases, the identification method is particularly robust because it requires both the recognition of the states of a plurality of stored symbols and the recognition of a specific arrangement of a certain number of these symbols in a valid state, this arrangement forming a stored reference pattern.

Figure 2:
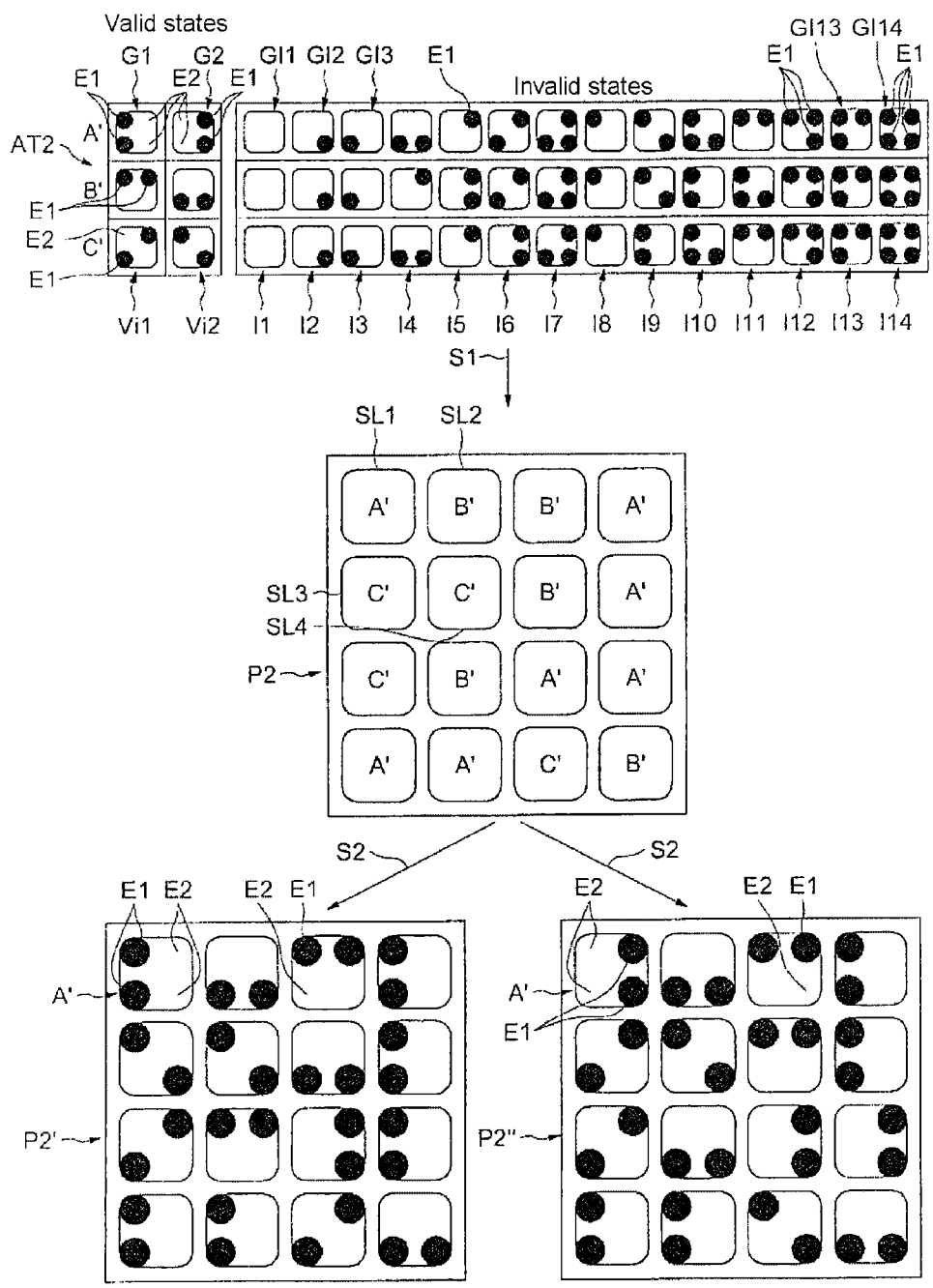
Figure 3:
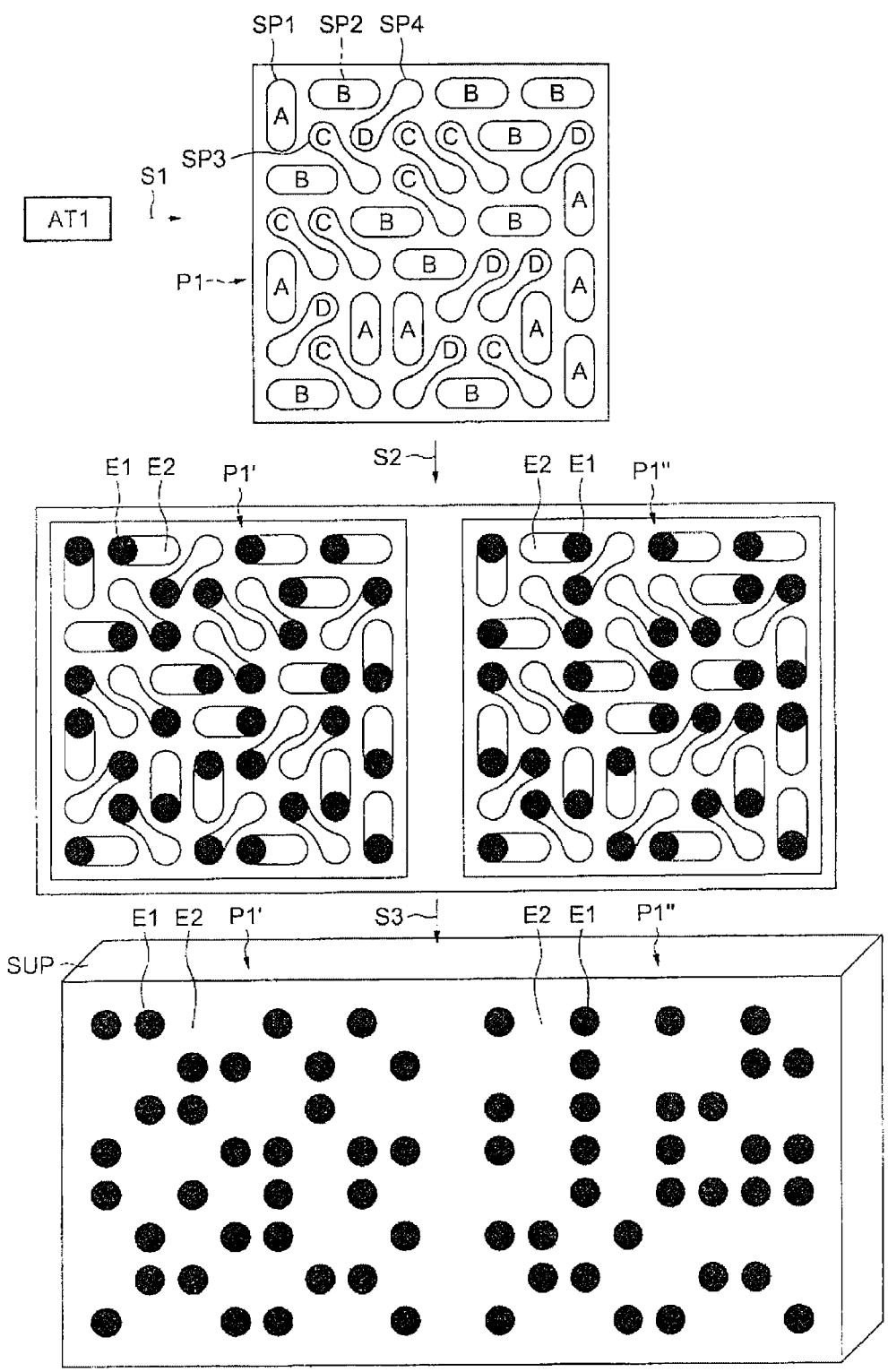
Figure 4:
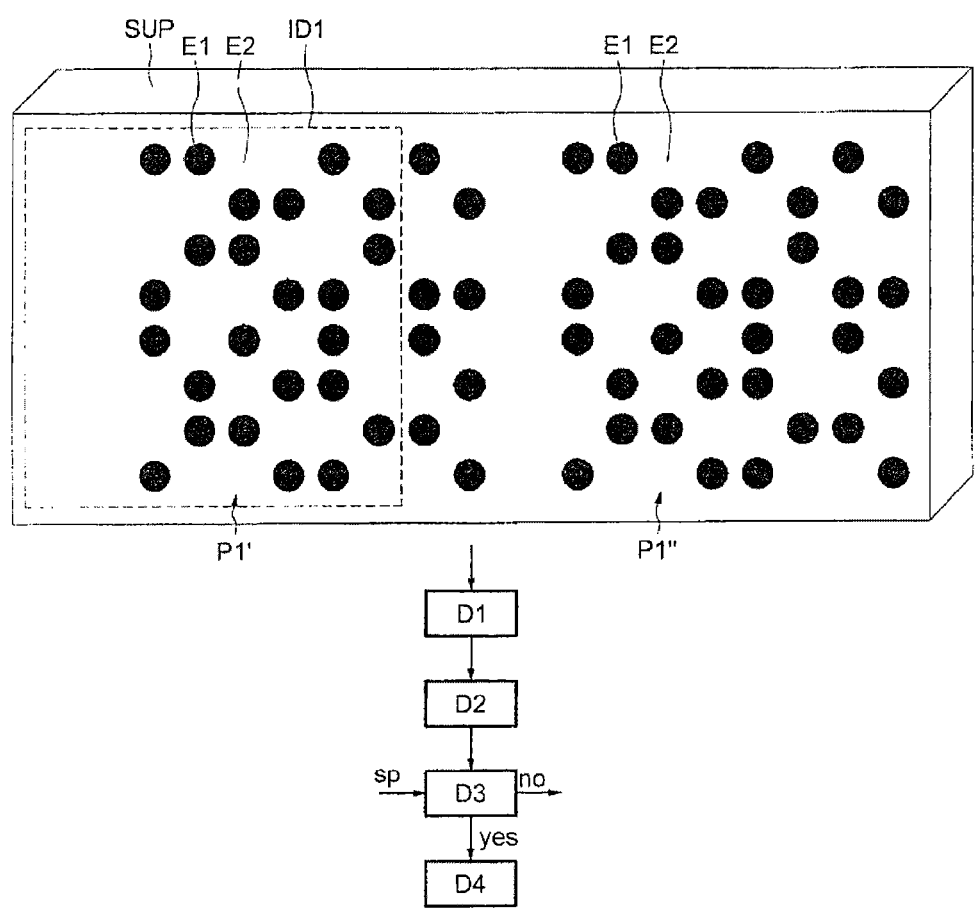

Other advantages and features of the invention will become apparent from studying the detailed description of a few exemplary implementations and embodiments, which are no way limiting, and the appended drawings, in which:

FIG. 1 schematically illustrates one implementation of a creation of an identification pattern according to the invention;

FIG. 2 schematically illustrates an implementation of a creation of another identification pattern;

FIG. 3 schematically illustrates an implementation of a method for marking the identification pattern of FIG. 1 on an article; and FIG. 4 schematically illustrates an implementation of a method for identifying an identification pattern applied to an article.

In the figures, the same references correspond to the same elements. The elements of the figures are not necessarily drawn to scale.

FIG. 1 schematically represents one implementation of a creation S1 of a two-dimensional reference pattern P1 according to the invention.

This pattern P1 comprises an arrangement of four symbols A, B, C, D, determined from an alphabet AT1.

The expression "two-dimensional reference pattern" should be understood here to mean an arrangement of a number of two-dimensional symbols which are arranged relative to one another in a determined position.

The expression "arrangement of symbols" should be understood to mean a particular arrangement of the two-dimensional symbols in the pattern.

The expression "identification pattern" should be understood to mean one possible representation out of the all the representations of the symbols of the reference pattern.

The term "symbol" should be understood here to mean a two-dimensional set of elements. An element of a symbol may be, for example, a dot, or a set of dots, such as a letter of the alphabet, an unevenness such as an indentation, a hole, a spur. An element may also be, for example, a color or a reflection of electromagnetic waves.

The set of these symbols forms what is called here an alphabet. In this alphabet, the symbols are different from one another even if the symbols may comprise elements of one and the same type as described above.

According to the invention, each symbol of the alphabet comprises a number of states, in particular more than two states, that is to say at least three states.

A state is a possible representation of a symbol. For example, if a symbol is a letter, a possible representation of a state is a lower case letter, another state or another possible representation is the same letter in upper case, yet another state or different representation is the same letter colored red, etc.

If the symbol is a word, a representation of a state may be a word written from left to right, or vice versa. If the symbol is a set of dots, a possible representation of a state may be a single dot, a pair of dots, another representation may be a non-dot, in other words an absence of any dot, a pair of non-dots, etc.

A valid state of a symbol is an arbitrarily chosen or authorized state out of all the possible states of this symbol. In other words a valid state is a single representation out of all the possible representations of the states of the symbol.

An invalid state is, a fortiori, an unauthorized state, that is to say another representation, distinct from the one used for the valid states of the same symbol. It should be noted that an invalid state of one symbol, for a determined alphabet, may be identical to a valid state of another symbol of the determined alphabet.

FIG. 1 shows an example of an alphabet AT1 which comprises four symbols A, B, C, D. Each symbol A, B, C, D comprises two valid states Vi1, Vi2 and two invalid states Ii1, Ii2. Each state of all the symbols comprises two groups of elements G1 to G16. In this implementation, each group G1 to G16 comprises two elements. Each element comprises a first representation E1 corresponding to a dot, that is to say a solid circle and a second representation E2 corresponding to a non-dot, that is to say a blank circle or even an absence of any dot.

As can be seen in FIG. 1, the symbol A of the alphabet AT1 has a first valid state Vi1 for which the group G1, arranged vertically, is formed by a dot E1, in the top part and a non-dot E2 in the bottom part.

The symbol A has a second valid state Vi2 for which the group G2, also arranged vertically, is composed of a non-dot E2 in the top part and a dot E1 in the bottom part. The two valid states Vi1 and Vi2 may, for example, represent the respective values 0 and 1 so as to produce a binary coding of an information item.

The same symbol A has two invalid states Ii1 and Ii2 comprising two groups G3 and G4 of two elements each arranged vertically. In the first invalid state, Ii1, the group G3 is composed of two non-dots E2 one above the other whereas, in the second invalid state Ii2, the group G4 is composed of two dots E1, situated one above the other but being separated by a gap.

The symbol B has a valid state Vi1, for which the group G5, arranged horizontally, is composed of a dot E1 in the left side portion in FIG. 1, and a non-dot E2 in the right side portion in FIG. 1. The symbol B has a second valid state Vi2, for which the group G6, also arranged horizontally, is composed of a non-dot E2 arranged on the left in FIG. 1 and a dot E1 arranged on the right in FIG. 1. The same symbol B has two invalid states Ii1 and Ii2, comprising two groups of two elements G7 and G8 arranged horizontally. In the first invalid state Ii1, the group G7 is composed of two non-dots E2 arranged horizontally side by side, whereas, in the second invalid state Ii2, the group G8 is composed of two dots E1 arranged side by side, but being separated by a central gap.

The symbol C has a valid state Vi1 for which a group G9, arranged diagonally in a first direction in FIG. 1, is formed by a dot E1 placed top left in FIG. 1 and a non-dot E2 placed bottom right. The second valid state Vi2 of the symbol C has a group G10, also arranged diagonally in the same direction as the group G9, and composed of a non-dot E2 situated top left in FIG. 1, and a dot E1 situated bottom right in FIG. 1. The same symbol C has two invalid states Ii1 and Ii2 comprising two groups of two elements G11 and G12, oriented diagonally in the same direction as the groups G9 and G10 of the two valid states Vi1 and Vi2 of the same symbol C. The groups G11 and G12 are respectively composed of two non-dots E2 and two dots E1 arranged at the ends of the diagonal and separated by a central gap.

The symbol D has two valid states Vi1 and Vi2, composed of the groups G13 and G14, arranged diagonally in a direction opposite to the direction of the groups G9 to G12. The group G13 corresponding to the first valid state Vi1 of the symbol D is composed of a dot E1 placed top right and a non-dot E2 placed bottom left in FIG. 1. The group G14 corresponding to the second valid state Vi2 of the symbol D is composed of a non-dot E2 placed top right and a dot E1 placed bottom left in FIG. 1.

The two invalid states Ii1 and Ii2 of the symbol D correspond to the two groups G15 and G16 each comprising two elements oriented diagonally in the same direction as the groups G13 and G14. The group G15 is composed of two non-dots E2 whereas the group G16 is composed of two dots E1 placed at the ends of the diagonal and separated by a central gap.

In the creation step S1, a reference pattern P1 is constructed from the symbols A, B, C, D belonging to the alphabet AT1. In this implementation, the pattern P1 comprises 32 symbols, a particular arrangement of which has been determined specifically, for example according to the information that the reference pattern is required to convey. It can be seen in FIG. 1 that the reference pattern P1 is constructed from a vertical, horizontal or diagonal arrangement of the different groups G1 to G16. The 32 symbols A, B, C and D are arranged interleaved with one another as illustrated in FIG. 1.

As can be seen in particular in FIG. 1, the interleaving of the different symbols is preferably done so that the different dots and non-dots are, in this example, aligned vertically and horizontally. As an example, it will be noted that, on the first top horizontal row X-X illustrated in FIG. 1 of the reference pattern P1, there are, in succession, from left to right, one element of the symbol A for which the group of elements is arranged vertically, two elements of the symbol B arranged horizontally, one element of the symbol D arranged diagonally in the abovementioned second direction, two elements of the symbol B arranged horizontally and two elements of the symbol B also arranged horizontally. The second horizontal row of the reference pattern P1 denoted Y-Y in FIG. 1 comprises the second element of the symbol A for which the first element was on the first row X-X, and, still working from left to right, one element of the symbol C arranged diagonally in the abovementioned first direction, the second element of the symbol D arranged diagonally for which the first element formed part of the first row X-X, in succession the elements of the two symbols C, two elements of the symbol B and one element of the symbol D.

Similarly, the first vertical line denoted Z-Z of the reference pattern or symbol P1 illustrated in FIG. 1 is composed, working from top to bottom, of two elements of the symbol A arranged vertically, one element of the symbol B arranged horizontally, one element of the symbol C arranged diagonally in the first direction, two elements of the symbol A arranged vertically, one element of the symbol D arranged diagonally in the second direction and one element of the symbol B arranged horizontally.

It will obviously be understood that a different arrangement could be adopted. It is, however, advantageous to appropriately interleave the different symbols so as to make the detection more difficult for a person who is unaware of the construction of the reference pattern and the alphabet used.

It will also be noted that, in the example illustrated, each of the symbols A, B, C and D has two valid states Vi1 and Vi2, in which the different groups of two elements each time comprise a dot and a non-dot. On the other hand, the invalid states Ii1 and Ii2 of the four symbols A, B, C and D are each time formed by a group of two elements of identical nature, that is to say two dots or two non-dots. This particular structure further increases the robustness of the reference pattern that can be created by the creation operation S1.

There are then a number of possibilities such as P1', P1", etc. to represent the duly created pattern P1. These representations P1', P1" of the pattern P1 are also hereinafter denoted identification patterns. In practice, given the fact that each symbol A, B, C, D can be represented by two distinct valid states Vi1, Vi2, and that the pattern P1 comprises 32 symbols, there are $2^{32}$=4 294 967 296 possibilities for representing the determined pattern P1. According to another example, if the pattern comprises 64 symbols, there are then $2^{64}$=18 446 744 073 709 551 616 possibilities for representing the determined pattern P1. Thus, each representation of a pattern such as P1 may correspond to an information item, which makes it possible to characterize an article on which one possible representation of the pattern is affixed. For example, it is possible to characterize the manufacturing source of the article, its place of distribution, and so on. All these information items make it possible to uniquely identify an article, and thus to fight against counterfeiting, if said article is, for example, distributed by an unauthorized person. As a variant, the information item is exclusively referenced in the specific arrangement of the reference pattern P1, the different representations P1', P1" etc. being created randomly so as to render the information contained in the reference pattern P1 totally undetectable.

FIG. 1 illustrates two possibilities of representation P1', P1" of the pattern P1, obtained by the operation S2. For each possibility P1', P1", the elements E1, E2 of the valid states Vi1, Vi2 of the symbols A, B, C, D of the pattern P1 are represented. In the representation P1', the symbol A1, for example, will be noted, represented by its valid state Vi1 as illustrated in FIG. 1, that is to say, with a dot E1 in the top portion and a non-dot E2 in the bottom portion. Also, on the first horizontal row of the identification pattern P1', the symbol B1 will be noted in its valid state Vi1, that is to say, with a dot E1 on the left of the figure and a non-dot E2 on the right of the figure. Still in the identification pattern P1', the symbol C1 will also be noted, in its first valid state Vi1, that is to say, with a dot E1 top left and a non-dot E2 bottom right, these two elements being arranged on a diagonal in the abovementioned first direction. Also in the representation P1', the symbols A2, B2 and C2 will be noted, using the second valid state Vi2 and the symbols D1, D2 respectively using the valid states Vi1 and Vi2.

In the representation P1", it can be seen that the symbol A1 indicated previously in the representation P1' is identical whereas the symbol B1 is replaced by B2 represented with its second valid state Vi2, namely with a non-dot E2 on the left and a dot E1 on the right. In other words, this symbol B in this position of the pattern P1 is used here with its representation corresponding to a valid state other than in the representation P1'. Similarly, the symbol C mentioned previously, and denoted C1 in FIG. 1 for the representation P1', is used, for the representation P1", with its second valid state Vi2, namely with a non-dot E2 top left and a dot E1 bottom right and denoted C2.

Observation of the two representations P1' and P1" illustrated in FIG. 1 shows that a certain number of symbols A, B, C and D are thus used either in a first valid state Vi1, or in a second valid state Vi2, such that the two representations P1' and P1" are totally different, although the same reference pattern P1 has been used.

FIG. 2 schematically represents another implementation of a creation S1 of a reference pattern P2.

FIG. 2 shows an alphabet AT2 which comprises three symbols A', B', C'. Each symbol A', B', C' comprises two valid states Vi1, Vi2 and fourteen invalid states I1 to I14. As in the preceding example, the two valid states Vi1 and Vi2 can represent the respective values 0 and 1 with a view to a binary coding of an information item in an identification pattern. Each state of all the symbols comprises a group of elements such as G1 and G2 for the two valid states Vi1 and Vi2 or GI1, GI2, GI3 . . . GI13, GI14 for the invalid states I1 to I14. Each group of elements G1 to GI14 comprises four elements each having a first representation E1 corresponding to a dot, that is to say a solid circle and a second representation E2 corresponding to a non-dot, that is to say, a blank circle or even an absence of dot. In the example illustrated in FIG. 2, the two groups G1 and G2 corresponding to the two valid states Vi1, Vi2 each time comprise two representations E1, that is to say two solid dots, and two representations E2, that is to say two non-dots. The advantage of such a choice is that an identification pattern P2', P2", obtained as will be described below, is uniform, that is to say that each group G1, G2 corresponding to the two valid states comprises the same density of dots E1. If these elements or dots E1 are produced by printing an ink, the result thereof is that the surface density of the ink on the pattern remains constant.

As can be seen in FIG. 2, each group of two elements for the different symbols A', B' and C' is approximately in the form of a square at the four corners of which are arranged the dots E1 and the non-dots E2. Thus, for the symbol A' in the valid state Vi1, two dots E1 are aligned vertically on the left portion of this square relative to FIG. 1 and two non-dots E2 are aligned vertically on the right portion of the square. For the valid state Vi2 of the same symbol A', two dots E1 are aligned vertically on the right side of the square and two non-dots E2 are aligned on the left portion of the square.

For the symbol B', two dots E1 are aligned horizontally in the top portion of the square for the valid state Vi1, and, in the bottom portion of the square, for the valid state Vi2. For the symbol C', two dots E1 are arranged diagonally opposite at two corners of the square on a diagonal oriented in a first direction for the valid state Vi1, and, on the other diagonal oriented in the other direction for the valid state Vi2. The non-dots E2 are each time arranged at the corners which are left free by the dots E1.

The different invalid states may comprise, for each of their groups GI1 to GI14: no dot E1, a single dot E1, two dots E1 or even three or four dots E1, such as, for example, for the group GI14. Here again, the non-dots E2 are arranged at the positions left free by the dots E1.

This alphabet AT2 being defined thus, it is possible to create a reference pattern P2 during a creation step denoted S1 in FIG. 2, by having a certain number of symbols A', B' and C' according to a determined arrangement. In the example illustrated in FIG. 2, the reference pattern P2 is in the form of a square comprising 16 symbols A', B' and C' according to a specific arrangement illustrated in FIG. 2.

During a step denoted S2, each symbol of the reference pattern P2 is assigned one of the two valid states Vi1 or Vi2. This assignment is made randomly or in a specifically determined manner according to an information item that the reference pattern is required to represent. FIG. 2 shows, as an example, two possibilities of representation denoted P2' and P2". It will obviously be understood that a large number of other possibilities can be envisaged with the two valid states Vi1 and Vi2. The two representations P2' and P2" differ by the use, for certain symbols of the reference pattern P2, of different valid states. Thus, the symbol A' located in the top left corner of the representation P2 is represented in the form of the valid state Vi1 corresponding to the group G1 of the alphabet AT2. The same symbol A' in the top left corner of the representation P2" is represented in the form of the valid state Vi2 corresponding to the group G2.

FIG. 3 schematically represents an implementation of a method for marking an article SUP using two representations P1' and P1" of a reference pattern P1 as described and illustrated in FIG. 1.

This method comprises the step S1 of creation of a reference pattern P1 comprising an arrangement of 32 symbols A, B, C, D, as described in relation to FIG. 1, a step S2 of assignment of valid states to the created pattern P1 and a step S3 of marking the representations P1' and P1" obtained of the valid states of the symbols A, B, C and D on the article SUP.

The term "marking" should be understood to mean a printing, for example of ink, an etching, that is to say a production of hollows and bumps on a medium, for example a metal medium, or any type of known representation of a pattern on an article. This marking may be visible, when it is, for example, produced in the visible scale, or invisible when it is produced in the form of signs, for example magnetic, which can only be detected by appropriate measuring instruments.

There are a number of means that make it possible to render the identification pattern undetectable to the naked eye. For example, it is possible to use an ink whose chemical nature renders it invisible to the naked eye but simply visible under specific lighting, for example using ultraviolet or infrared lighting.

Advantageously, in order to strengthen the security of the marking of the representations of the reference pattern, it is possible to use inks whose chemical nature renders it invisible to the naked eye. The composition of this ink may comprise one or more pigments and/or colorants which absorb in the visible or invisible range of the electromagnetic spectrum and/or may also comprise one or more pigments and/or colorants which are luminescent. Non-limiting examples of appropriate pigments and/or colorants which absorb in the visible or invisible ranges of the electromagnetic spectrum include the derivatives of phthalocyanine. Nonlimiting examples of appropriate luminescent pigments and/or colorants include the derivatives of lanthanides. The presence of pigment(s) and/or a colorant(s) makes it possible to enhance and strengthen the security of the marking against counterfeiting.

It is also possible to mix the identification pattern with a noise, for example by incorporating the identification pattern in an environment of the surface of the article SUP, for example preexisting irregularities. These irregularities must be comparable to the size of the pattern.

Moreover, it is possible to use a very small printing scale, from 150 to 500 dpi units (dpi standing for dots per inch, that is to say a number of pixels per inch, one inch being equivalent to 2.54 centimeters) which reflects the precision of the printing. With such a printing scale, the identification pattern cannot be distinguished with the naked eye from the background of the printing medium. Furthermore, the reproduction of the identification pattern would then entail using an even finer scale in order to avoid any reproduction error, which is almost impossible in practice. As illustrated in FIG. 3, in the step S1 of creation of the pattern P1, a particular arrangement of symbols from the symbols A, B, C, D of the alphabet AT1 is determined as explained above. Then, in the assignment step S2, a valid state Vi1 or Vi2 is assigned to each symbol of the pattern P1, so as to obtain different possible representations P1', P1", etc. out of all the possible representations.

Then, in the marking step S3, the representation or representations such as P1', P''', etc. of the pattern P1 is/are marked on the article SUP by marking the representations E1, E2 of the valid states Vi1, Vi2 which have been assigned to each symbol of the pattern P1.

The identification pattern P1', P1" makes it possible to code an information item concerning the article SUP and/or its method of use.

In the example illustrated in FIG. 3, two representations P1', P1" of the pattern P1 have been marked on the article SUP. In other words, for each representation P1', P1" of the pattern P1, the dot/non-dot representations of each symbol A, B, C, D of the pattern P1 have been marked on the article SUP. It would obviously be possible to mark on the article only a single representation such as P1', or even, a greater number of representations of the reference pattern P1.

Moreover, the creation of an alphabet in which the invalid states of the symbols comprise the same representations as those used for the valid states, but in a different arrangement, makes the recognition of the identification pattern more difficult. If the example of the alphabet AT2 is taken, in practice, the invalid state I10 for the symbol B' corresponds to the valid state Vi1 of A'. Any one not knowing the reference pattern P2 could therefore make an incorrect reading by believing the symbol A' had been detected. The knowledge of the reference pattern P2 on the other hand makes it possible to correctly locate the symbol A' and eliminate the ambiguity.

If the user does not know the reference pattern beforehand, it is therefore almost impossible for he or she to be able to recognize it from the states represented on the article SUP. In particular, there is one chance in 4 294 967 296 of determining the pattern P1, when the latter comprises thirty two symbols as illustrated in FIGS. 1 and 3. In the case where the pattern P1 comprises sixty four symbols, there is then one chance in $2^{64}$ of determining the pattern P1.

The reference pattern P1 or P2 can also be used to encrypt a digital information item. The valid states Vi1, Vi2 of the symbols of the reference pattern are then used to code this digital information item. This digital information item may be a numerical value of binary type.

For example, it is possible to code the binary value 1100 (or 12 in decimal) with the first four symbols SP1, SP2, SP3, SP4 illustrated in FIG. 3 of the determined pattern P1. For this, it is possible to establish the following code, for each symbol A, B, C, D of the determined pattern P1: the first valid state Vi1 corresponds to the value 1 and the second valid state Vi2 corresponds to the value 0. In this case, the first symbol SP1 of the determined pattern P1 corresponds to the value 1, the second symbol SP2 of the determined pattern P1 corresponds to the value 1, the third symbol SP3 of the determined pattern P1 corresponds to the value 0, the fourth symbol SP4 of the determined pattern P1 corresponds to the value 0. Thus, the first four symbols represent the decimal value 12. It is also possible to choose other codes for which each first valid state of the symbols of the pattern P1 corresponds to 1 or 0, depending on the code chosen. This digital information item may be a date of birth, a product reference, for example a reference to its place of manufacture, its place of distribution, its content, a datum characteristic of the article on which the pattern is represented, etc.

The method of marking from the reference pattern P2 illustrated in FIG. 2 proceeds in the same way with, in the marking step S3, the use of one or more representations P2', P2", etc. of the reference pattern P2 on an article SUP.

FIG. 4 represents an implementation of a method of identifying an identification pattern P1', P1", affixed or marked on the article SUP.

An alphabet and a reference pattern, in other words a particular arrangement of a certain number of symbols of the stored alphabet, are stored beforehand.

In the example illustrated, the identification method comprises a step D1 in which an image is captured of an area of the article SUP, a step D2 of identifying symbols, and a step D3 of identifying the identification pattern P1', P1". Furthermore, this method may comprise a step D4 of decrypting a digital information item.

In the step D1, an image ID1 is captured of an area of the article SUP with, for example, a decoding camera, the image being stored in a memory. Then, in the step D2, the symbols contained in this stored image ID1 are identified from the stored alphabet which was used when marking the representations P1', P1" on the article SUP.

The symbol identification step D2 is applied to a captured image which comprises one or more identification patterns.

The arrangement of the symbols of the reference pattern, and therefore the position of each symbol in the reference pattern, are known beforehand.

The stored reference pattern is therefore superposed on an area of the captured image. Then, a symbol of the reference pattern is selected, for example a first symbol positioned top left in the reference pattern, and the representation of a symbol of the alphabet contained in the area of the captured image located in the same position as that of the selected symbol is determined. If the determined representation corresponds to at least one representation of a valid state of the selected first symbol of the reference pattern, it is considered that the symbol selected in the reference pattern has been identified in the area of the captured image. Otherwise, it is considered that the selected symbol has not been identified.

Then, another symbol of the reference pattern is selected, preferably a symbol immediately adjacent to the preceding one, and the comparison of the symbol representation of the area of the image situated in the position of the second selected symbol with the representations of the valid states thereof is reiterated. If the symbol representation of the image corresponds to at least one representation of a valid state of the second symbol, the second symbol is considered to be identified. Then, the preceding step is reiterated for each symbol of the reference pattern by comparing a representation of the image situated in the same position as the selected symbol of the reference pattern with the representations of the valid states thereof until all the symbols of the reference pattern are identified or not.

If at least one symbol is identified, the following step D3 of identifying the identification pattern is performed; otherwise, it is possible, for example, to move the camera, or the article, and reiterate the method from a new captured image, or it is possible to move within the captured image by a step equal to the height or to the width of a symbol of the stored alphabet and the method is reiterated in another area of the captured image. The physical movement, in order to capture a new image, can be done by moving the camera, for example, step by step, the width of a step substantially corresponding to the width or a height of a representation of an element of a symbol, or by moving the article while keeping the camera fixed. The movement in the captured image can be obtained by software means according to a step determined in terms of number of pixels according to the resolution of the image.

In a practical embodiment, it is possible to provide a fairly large quantity of identification patterns arranged on the article, side-by-side and one above the other, for example 20×20 identification patterns. The viewing camera may then be fixed and encompass a large number of identification patterns to perform the abovementioned identification.

When the step D3 is performed, the number of identified symbols is calculated. If all the symbols are identified, it is considered that the identification pattern has been identified. The expression "identified symbol" should be understood here to mean a symbol detected in the image ID1 which corresponds to a symbol of the stored reference pattern, and which is also arranged on the article according to the arrangement of the symbols of the reference pattern.

If, however, the symbols detected in the image ID1 are not all identical to those of the stored reference pattern, the number of identified symbols is then calculated, and if this number is greater than a probability threshold, it is considered that the identification pattern has been identified.

For example, according to a preferred embodiment, the two-dimensional reference pattern has a dimension 16×16, that is to say that it comprises 256 states, or 128 pairs of states. In this case, it is considered that a recognition of 30 pairs of states, correctly arranged relative to the reference pattern, is sufficient to consider that the identification pattern has been recognized. In other words, if an alphabet is considered which comprises symbols for which the valid states are represented by a pair of states, and that a reference pattern of dimension 16×16 comprises 128 symbols, it is sufficient to identify 30 symbols out of the 128 symbols of the identification pattern to consider that the identification pattern has been identified. In this case, the probability threshold is equal to approximately 24%.

According to another example, if an alphabet is considered which comprises symbols for which the valid states are represented by four states, and that a reference pattern of dimension 16×16 comprises 64 symbols, it is sufficient to identify 10 symbols out of the 64 symbols of the identification pattern to consider that the identification pattern has been identified. In this case, the probability threshold is equal to approximately 16%.

A partial alteration of a certain number of symbols of an identification pattern can therefore be tolerated. This represents an affirmation of the robustness of the identification of the identification pattern.

If the percentage of symbols identified is sufficient, it is then considered that the identification pattern contained in the image corresponds to a representation of the reference pattern which has been stored. This probability threshold makes it possible to tolerate the errors in reading the representations contained in the image, or the errors of representation of the identification pattern when marking the latter on the article.

It will be noted that, in the marking of the valid states of the reference pattern on the article, invalid states seem to appear because of the alphabet used in which the symbols comprise at least one invalid state. This makes it all the more difficult for an unauthorized user to determine the valid symbols, and thereby renders the identification pattern almost undetectable.

A margin of movement heightwise and widthwise is tolerated for each dot of each symbol. Slight differences of diameter in the dots or spots which define the representations of the symbols do not affect the detection. Nor do slight differences of position affect the detection since the reading of the identification pattern is done by comparing a position of one symbol relative to another.

In the case where it is considered that the identification pattern has not been recognized, that is to say if the identification conditions defined above are not valid, the fact that the article is not identified is signaled (arrow denoted "no" in FIG. 4). If, however, the article is identified (arrow denoted "yes" in FIG. 4), the information contained in the identification pattern can be taken into account, for example to trace the manufacture of the article or to use the article in a certain way (authorized washing temperature, steam pressing recommended, etc.).

According to another implementation, the identification pattern may represent a digital information item and the identification method comprises a step D4 in which the value of the digital information item is identified on the basis of the valid states of the symbols of the recognized identification pattern and the code used in encrypting said digital information item.

The identification method may also comprise conventional error correction steps in order to determine the expected valid states of the symbols which have not been able to be identified in the step D2 of determining the states of the identified symbols.

Thus, using error corrections, it is possible to consider that the identified symbols correspond to those of the determined reference pattern with a better reliability.

Also proposed is a system of two-dimensional representation of a reference pattern configured to implement the method described in FIG. 3.

In one embodiment, the representation system comprises at least one memory configured to store an alphabet such as AT1 or AT2 comprising a number of symbols, creation means for creating a reference pattern P1 or P2 from this alphabet and representation means configured to represent at least one possibility of representation of the created reference pattern P1. These representation means are also configured to assign, randomly, to each symbol of said created reference pattern, a valid state out of the valid states of said symbol, and to store the representations of the reference pattern P1 deriving from the assignment in a memory.

Furthermore, the system comprises marking means for marking the representations of the reference pattern P1 on a medium SUP. These marking means are, for example, inkjet or laser printing means, engraving means based on techniques such as photo-engraving, photogravure, laser etching, engraving using a router, or even intaglio etching on metal (engraving using a graver or an acid) according to the surface used. Furthermore, the marking means may be printing means based on flexography, screen printing, stamp printing (marking method based on the transfer of ink using a flexible stamp), lithography, or xerography. For example, the marking means are able to mark the representations of the reference pattern using an ink visible to the naked eye or invisible to the naked eye.

These marking means may even be thermal printing means or embossing means which can be used, for example, on polymeric or metal surfaces.

Each marking technique is used according to the type of article on which the identification pattern or patterns is/are marked.

Also proposed is a system for identifying the identification pattern obtained according to the two-dimensional representation method described in FIG. 3, configured to implement the identification method described in FIG. 4.

In one embodiment, the identification system comprises a detector, for example a digital camera, able to detect an area of the article comprising representations of symbols. The identification system also comprises at least one memory configured to store an alphabet and a reference pattern defined from said alphabet, determination means for determining the symbols that have a valid state out of the symbols of the detected area, and comparison means for comparing all the symbols that have a valid state and their arrangement in the detected area with the defined reference pattern stored in memory.

Furthermore, the robustness of the identification of the identification pattern can be enhanced by having a number of representations (identical or not) of the reference pattern on the article. The need to have to place the article according to an exact position when the detector is fixed is thus avoided.

The means mentioned above may be produced as software in a microprocessor and/or by logic circuits.

The identification pattern thus defined allows for a robust identification of articles. Such an identification pattern is also illegible to the unauthorized user and does not detract from the article on which it is inscribed. This identification pattern makes it possible to safely identify an article for better traceability of the article. In a commercial context where there are numerous counterfeitings, the proposed identification pattern makes it possible to convey information so as to fight against any fraudulent use of articles.

The invention claimed is:

1. A two-dimensional identification pattern, comprising:
   an arrangement of representations of symbols belonging to an alphabet, each symbol of the alphabet comprising at least three states, including at least two valid states and at least one invalid state, each representation of a symbol in the arrangement corresponding to a valid state of the symbol,
   wherein each state of the symbols of the alphabet comprises a group of elements, each of the groups of elements comprising at least two elements, each element having a possible representation out of a set of representations comprising a first representation and a second representation distinct from the first representation, and
   each symbol comprises a first valid state comprising a first group of at least one element represented according to the first representation and at least one element represented according to the second representation, and a second valid state comprising a second group of at least one element represented according to the second representation and at least one element represented according to the first representation.

2. The pattern as claimed in claim 1, in which each of the groups of elements comprises more than two elements, and in which each symbol comprises a first valid state comprising a first group composed of a number of elements represented according to the first representation and of a number of elements represented according to the second representation, and a second valid state comprising a second group of a number of elements represented according to the second representation and of a number of elements represented according to the first representation.

3. The pattern as claimed in claim 1, in which the groups of elements comprise one and a same number of elements represented according to one of the representations.

4. The pattern as claimed in claim 1, in which at least one valid state of at least one symbol of the pattern represents a digital information item.

5. The pattern as claimed in claim 4, in which the valid states of each symbol respectively represent binary values of a digital information item.

6. An article comprising at least one pattern according to claim 1.

7. The article as claimed in claim 6, comprising a number of patterns, all identical or all different.

8. The article as claimed in claim 6, comprising a number of identical patterns and a number of different patterns.

9. The article as claimed in claim 6, in which the article is chosen from a box, a sheet, a cartridge, a capsule containing an edible substance, a bottle stopper, a bank note, a passport, a security document, a label, a card, a trade voucher, a pharmaceutical pill, a watch, a package, a semiconductor, or a computer peripheral device.

10. A method for marking an article with an identification pattern which may include an information item relating to the article and/or use of said article, the method comprising:
    defining an alphabet which includes a number of symbols;
    defining, for each symbol, at least two valid states and at least one invalid state;
    creating a reference pattern which comprises a set of symbols of the alphabet;
    creating at least one representation of the reference pattern by assigning a specific valid state to each symbol of the reference pattern; and
    applying a marking reproducing the at least one representation of the reference pattern to the article,
    wherein each state of the symbols of the alphabet comprises a group of elements, each of the groups of elements comprising at least two elements, each element having a possible representation out of a set of representations comprising a first representation and a second representation distinct from the first representation, and
    each symbol comprises a first valid state comprising a first group of at least one element represented according to the first representation and at least one element represented according to the second representation, and a second valid state comprising a second group of at least one element represented according to the second representation and at least one element represented according to the first representation.

11. The method as claimed in claim 10, each valid state of one symbol being different from a valid state of another symbol.

12. The method as claimed in claim 11, in which each invalid state of a symbol is different from the valid states of any one of the symbols.

13. The method as claimed in claim 10, in which the valid states of all the symbols are represented by a group of elements comprising a same number of elements.

14. A method for identifying an identification pattern applied to an article and which may include an information item relating to the article and/or use of said article, the method comprising:
    capturing an image of an area of the article which includes at least a portion of a representation of at least one stored reference pattern comprising an arrangement of a number of symbols belonging to a stored alphabet, each symbol comprising at least two valid states and at least one invalid state, each representation of a symbol in the arrangement corresponding to a valid state of the symbol, and the captured image is stored;

identifying the symbols of the stored alphabet of symbols by comparing the captured image with the arrangement of representations of symbols of the stored reference pattern;

computing a number of identified symbols represented in a valid state and arranged according to the arrangement of the stored reference pattern;

comparing a result of the computation to a probability threshold; and sending an identification signal if the result reaches the threshold, wherein a first symbol is defined in a first position of the arrangement of the stored reference pattern, the captured image is searched for a representation of at least one valid state of the first symbol, if this representation is found, the selected symbol is considered as being identified, then another symbol is defined in another position of the arrangement of the stored reference pattern, and the preceding search step is reiterated for this other symbol in this other position, and so on until all the symbols of the stored reference pattern are identified or not.

15. The identification method as claimed in claim 14, further comprising decrypting at least one digital information item represented by at least one valid state of at least one symbol of the identification pattern comprising an identification of the digital information item based on at least one valid state of at least one identified symbol.

* * * * *